UNITED STATES PATENT OFFICE.

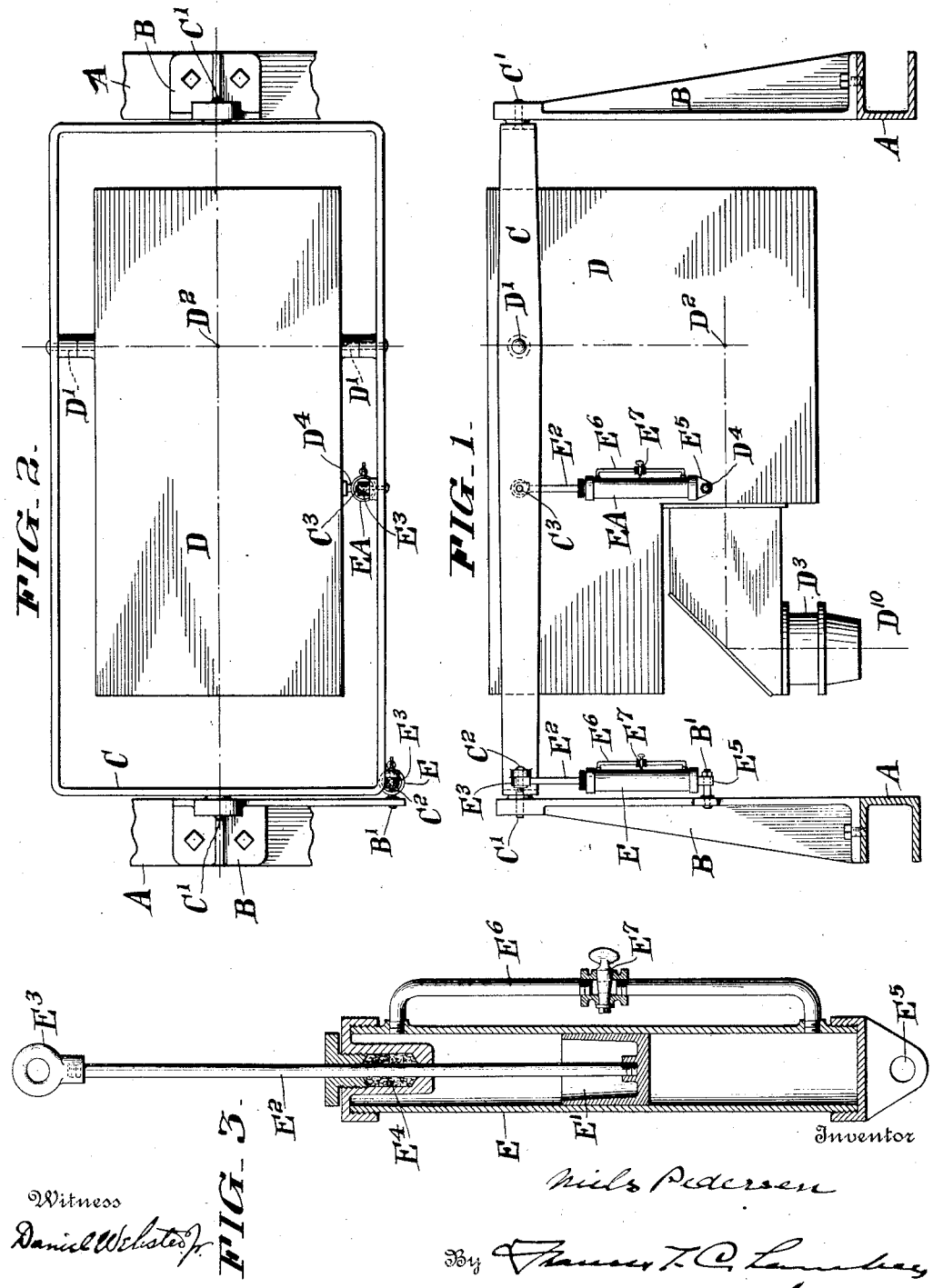

NIELS PEDERSEN, OF PHILADELPHIA, PENNSYLVANIA, ASSIGNOR TO ARTHUR BROCK, JR., OF PHILADELPHIA, PENNSYLVANIA.

CAMERA-MOUNTING.

1,221,902.

Specification of Letters Patent.

Patented Apr. 10, 1917.

Application filed May 6, 1916. Serial No. 95,891.

*To all whom it may concern:*

Be it known that I, NIELS PEDERSEN, a citizen of the United States of America, and a resident of the city and county of Philadelphia, in the State of Pennsylvania, have invented a certain new and useful Improvement in Camera-Mountings, of which the following is a true and exact description, reference being had to the accompanying drawings, which form a part thereof.

My present invention relates to camera designed for use upon aeroplanes, balloons, or other moving supports, and the object of my invention is to provide simple and effective means for connecting a camera to its support so that what may be called the external optical axis of the camera may be maintained in substantial parallelism with itself, notwithstanding movements of the support tending to disturb such parallelism.

My invention is especially devised, and is particularly adapted for use in mounting a camera on an aeroplane for map making and military reconnaissance purposes. With a camera mounted on an aeroplane and used for the purposes specified, it is highly desirable, and in general essential, if the photographs taken are to be scaled for map making or range finding or other accurate distance determinations, that the plane of the film portion or plate undergoing exposure shall be in optical parallelism with the plane of the horizon, or in other words, that the external optical axis of the camera shall be maintained vertical. As is well known, however, an aeroplane in use is practically never continuously maintained on what may be called an even keel, but on the contrary is constantly pitching or tipping. In consequence, a camera rigidly mounted on the aeroplane fuselage will not give pictures from which distances can be scaled with exactness.

To support a camera on an aeroplane in accordance with the present invention, I connect the camera to the aeroplane fuselage by a cardesian coupling or like universal mounting with the center of gravity of the camera below the center of support of the camera. A camera thus mounted becomes, in effect, a short pendulum having a definite natural frequency of vibration, and each movement of the aeroplane away from or toward the position of even keel tends to give the camera a pendulum oscillation about its center of support. The natural frequency of pendulum oscillation of the camera is much higher, however, than the frequency of the ordinary pitching and laterally swaying movements of the aeroplane, and in carrying out my invention I take advantage of this difference in frequency of movement by interposing between the camera and the aeroplane frame, means adapted to yield readily to permit the camera to adjust itself, plumb bob fashion, as the aeroplane tilts or pitches, but operative to substantially damp out the more rapid pendulum oscillations of the camera which each tilting or pitching movement of the aeroplane tends to set up.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Figure 1 is a side elevation of a camera mounted on an aeroplane in accordance with the present invention, a portion of the aeroplane fuselage being shown in section;

Fig. 2 is a plan view of the structure shown in Fig. 1; and

Fig. 3 is an enlarged sectional elevation of one of the yieldable damping devices employed.

In the particular construction shown in the drawings, A represents a portion of the frame work or fuselage of the aeroplane, and B brackets attached to the frame work A and forming the primary supports for the camera. C represents a rectangular open gimbal frame member having trunnions C' at its opposite ends which are journaled in the upper ends of the brackets B. D represents the camera proper, the housing of which is formed with trunnion like extensions D' at opposite sides which are journaled in the frame member C. The axes of the trunnions C' and D' intersect each other at right angles and at an appreciable distance above the center of gravity $D^2$ of the camera and the parts are so arranged that the camera tends to assume a position in which the external optical axis $D^{10}$ of the camera is vertical and the plane of the plate or film portion being exposed is in optical parallelism with the plane of the horizon. By the term "external optical axis, of the camera" I mean, of course, the portion of the optical axis of the camera external to the camera housing, and those skilled in the art will understand that whether the plate or film exposed does or does not actually lie in a horizontal plane, when in optical parallelism with the plane or horizon, depends on the character of the lens or lens and mirror system within the camera housing.

I connect the gimbal frame member C to the stationary frame of the aeroplane by a yieldable damping device E which, as shown, comprises a cylinder, a piston $E'$ working therein, a piston rod $E^2$ passing through a stuffing box $E^4$ at one end of the cylinder and means for permitting a restricted communication between the opposite ends of the cylinder. As shown, the last mentioned means comprises an external tubular by-pass pipe $E^6$ and an adjustable throttle valve or cock $E^7$ in the by-pass pipe. The cylinder is shown as provided with an apertured ear $E^5$ at one end which is journaled on a stud $B'$ carried by one of the brackets B, and the outer end of the rod $E^2$ is formed with an eye $E^3$ journaled on a stud $C^2$ secured to the gimbal frame C.

The camera frame D is connected to the gimbal frame C by a device EA which may be, and is shown as being, a duplicate of the device E. The apertured ear $E^5$ of the device EA is pivotally connected to the stud $D^4$ of the camera D, and the ear $E^3$ at the outer end of the piston rod $E^2$ is pivotally connected to the stud $C^3$ carried by the gimbal frame C. The cylinders of the devices E and EA are filled with a suitable fluid which may advantageously be oil.

With the construction described, the device E acts to regulate the movement of the gimbal frame C and parts supported by the latter about the axis of the trunnion $C'$ with respect to the aeroplane frame work. Similarly, the device EA regulates the movement of the camera relative to the gimbal frame about the axis of the trunnion $D'$. In the practical use of the invention the parts are so proportioned, and the flow restricting capacity of each pass $E^6$ is so adjusted by the setting of the corresponding valve $E^7$, that the devices E and EA will practically obliterate all oscillatory movements of the camera D about its center of support which are of the relatively high frequency of the natural pendulum period of vibration of the camera D, while at the same time they will yield to permit the camera to maintain its center of gravity $D^2$ below the center of support of the camera as the aeroplane pitches and sways in normal use.

While in accordance with the provisions of the statutes I have illustrated and described the best form of my invention now known to me, it will be apparent to those skilled in the art that changes can be made in the form of my invention without departing from its spirit, and that some features of my invention can be used without a corresponding use of other features of the invention.

Having now described my invention, what I claim as new and desire to secure by Letters Patent, is:—

1. The combination with a movable support, of a camera connected thereto by a suspension permitting a universal gravity adjustment of the camera relative to said support as the latter moves relative to a vertical line through the center of suspension, and means acting between the camera and support and adapted to damp out pendulum like oscillations of the camera while yielding to permit the camera to adjust itself to slower movements of said support relative to said vertical line.

2. The combination with a movable support, of a camera connected thereto by a suspension permitting a universal gravity adjustment of the camera relative to said support as the latter moves relative to a vertical line through the center of suspension, and means acting between the camera and support and adapted to damp out pendulum like oscillations of the camera while yielding to permit the camera to adjust itself to slower movements of said support relative to said vertical line, said means including provisions for adjusting its motion retarding effect.

3. In combination, a camera and a mounting therefor comprising a gimbal frame to which the camera is pivotally connected, supports to which said gimbal frame is pivotally connected to turn about an axis at right angles to the axis of the pivotal connection between the camera and frame, a yielding damping device connecting said support and gimbal frame and a yielding damping device connecting the camera and gimbal frame.

4. In combination, a camera and a mounting therefor comprising a gimbal frame to which the camera is pivotally connected, supports to which said gimbal frame is pivotally connected to turn about an axis at right angles to the axis of the pivotal connection between the camera and frame, a yielding damping device connecting said support and gimbal frame and a yielding damping device connecting the camera and gimbal frame, each damping device including a cylinder, a piston working therein and means providing a restricted communication between the opposite ends of the cylinder.

5. The combination with the frame of an aeroplane of a camera connected thereto by a suspension permitting a uniform gravity adjustment of the camera, and means acting between the camera and aeroplane frame and adapted to damp out pendulum oscillations of the camera while yielding to permit the camera to adjust itself to movements of the aeroplane toward and away from a position of even keel.

NIELS PEDERSEN.